Nov. 23, 1965 P. D. WENZEL 3,219,125
AGRICULTURAL IMPLEMENT
Filed Aug. 2, 1963 4 Sheets-Sheet 3

INVENTOR.
PHILIP D. WENZEL
BY
Emerson B Donnell
Attorney

Nov. 23, 1965   P. D. WENZEL   3,219,125
AGRICULTURAL IMPLEMENT
Filed Aug. 2, 1963   4 Sheets-Sheet 4

INVENTOR.
PHILIP D. WENZEL
BY
Emerson B Donnell
Attorney

United States Patent Office 3,219,125
Patented Nov. 23, 1965

3,219,125
AGRICULTURAL IMPLEMENT
Philip D. Wenzel, Rockford, Ill., assignor to J. I. Case Company, Racine, Wis., a corporation of Wisconsin
Filed Aug. 2, 1963, Ser. No. 300,416
13 Claims. (Cl. 172—225)

The present invention relates generally to agricultural implements and is particularly directed to an improved form of a two-way plow with a single gauge wheel, improved draft means, and novel and improved means for turning the plow, or reversing it at the end of the field.

Such a plow is characterized by at least one pair of oppositely disposed plow bottoms, and operates to selectively turn a furrow either to the right or the left. It is very effective in avoiding "dead" furrows, and in performing most efficiently the necessary plowing operations for contour farming, and in operation on slopes so that all of the furrows can be turned uphill to thereby provide ridges for catching and holding water so as to give it time to soak into the ground. This invention is particularly concerned with a two-way plow wherein the oppositely oriented plow bottoms are arranged in diametrically opposed relation to each other, and are rotated about a longitudinal axis in the process of changing from one to the other.

Such plows are known in which the structure embodies a beam frame which rolls on such longitudinal axis, and a number of forms of such plows have been built. However, there is difficulty in building sufficient strength into such a structure and, while substantial weight is desirable in such a plow, the weight which is desirable is limited. Prior attempts have resulted in excessive weight and substantial complication.

A further difficulty resides in controlling the depth of plowing, and some designs have required duplicate gauge wheels, one for right-hand plowing and the other for left-hand plowing. A better solution is the use of a single gauge wheel and mechanism for shifting its position so that it may serve for either type of plowing. This has run into considerable complication, and in operation has introduced undesirable shock loads.

Further difficulties are present in the mechanism for turning the beam frame for reversing the furrow at the end of the field. This has resulted in much complication in the past. Cables, chains, gears, etc., and their operating parts have all added complication and excessive weight, as well as exposed working parts which are vulnerable to the hazards of a rough operation. Furthermore, the carrier with its multiple plow bottoms is heavy and tends to produce a heavy shock at the end of each turnover movement.

The principal object of the invention is to improve a plow of the above type in a manner to insure ample strength; avoid excessive weight and present an attractive appearance; provide reliable control of the depth of plowing; and to provide an arrangement for turning the plow over which involves a minimum of complication and shock loading with excellent reliability and durability, the mechanism (with the exception of a bare minimum of very rugged parts) being substantially entirely enclosed so as to be protected from the dirt encountered in this class of service.

The plow includes a single gauge wheel for determining the depth of penetration, the gauge wheel being automatically positioned in operative relation to the selected plow bottom as the latter is moved from an inoperative to an operative position. It also involves a novel draft arrangement and improved means for releasably maintaining the selected plow bottom in position, and to release it automatically upon initiation of the turn-over operation.

Other objects and advantages will be noted in the description of the selected embodiment of the invention which is illustrated in the accompanying drawings.

Similar reference characters have been applied to the same parts wherever they occur throughout the drawings and specification.

Figure 1:
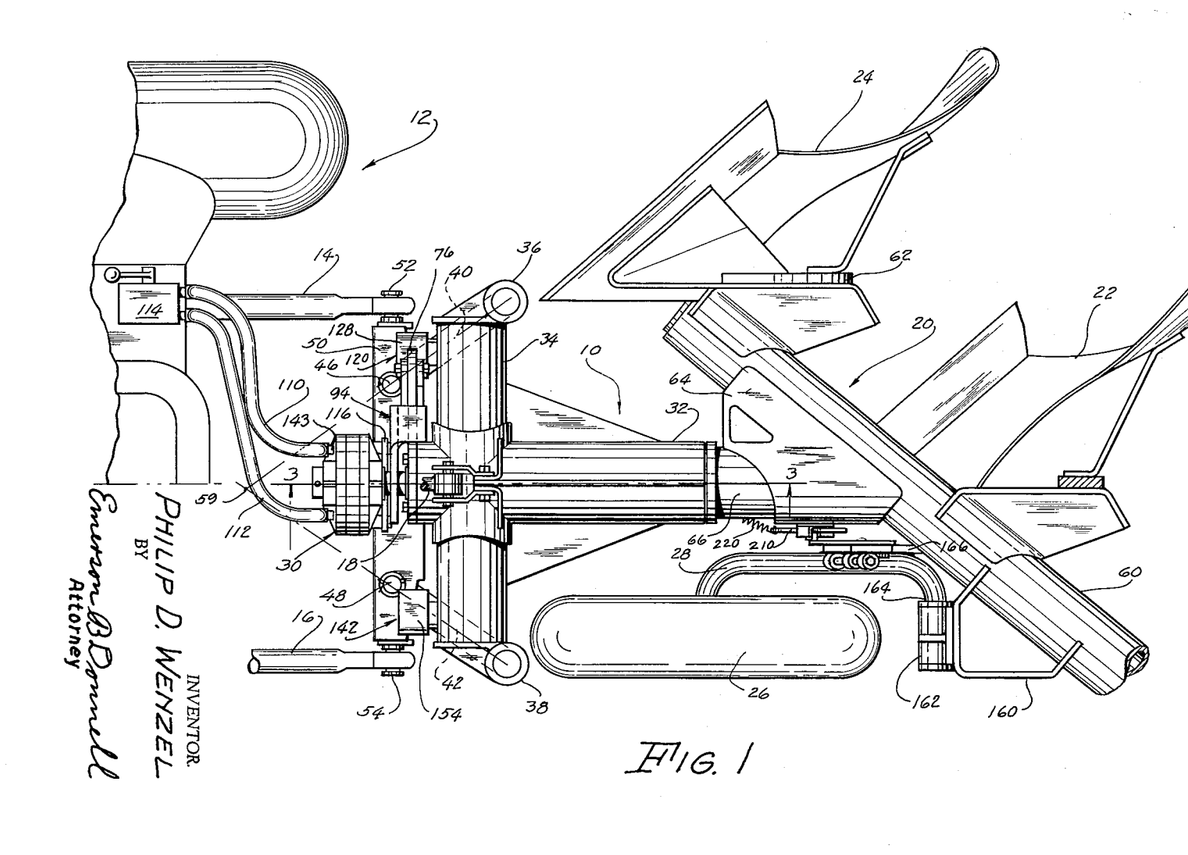
FIG. 1 is a plan view of a plow of the type contemplated, shown attached to a tractor, parts being broken away and others removed.

As seen in FIG. 1, the plow has a draft frame, generally designated as 10, adapted to be carried on a tractor 12 by hitch arms 14 and 16, and an upper link 18, draft frame 10 supporting a beam frame or carrier 20, on which are fixed right-hand and left-hand plow bottoms as 22 and 24. A gauge wheel 26 is journaled on an axle 28 and serves to support the draft frame and carrier.

When the carrier is to be turned over, a motor 30 does the work, arms 14 and 16 being swung upwardly by well-known mechanism on the tractor so as to raise the plows out of the ground, and as the carrier is rotated, axle 28 changes its position (as will be described), so that wheel 26 rests on the ground and supports the weight of the assemblage with one type of plow in the ground at a selected depth. Upon reversal of the carrier, axle 28 is shifted (as will appear) into position for wheel 26 to support the parts with the opposite type of plow in the ground at the predetermined depth. The mechanism by which this is accomplished will be described in detail.

Draft frame 10 includes as a major part of its structure, a sleeve bearing 32 to which is rigidly and permanently united a transverse tubular element 34 Member 34 has at its ends, bearings 36 and 38 having axes which are substantially vertical in the working position of the plow, the bearings having journaled therein links 40 and 42. Links 40 and 42 extend forwardly and inwardly in converging relation to each other and have enlarged bearing portions as 44, FIG. 2, journaled on pins 46 and 48 which are fixed in a cross bar 50. Cross bar 50 has outwardly extending pintles 52 and 54 which are engaged in well-known manner with above-mentioned hitch arms 14 and 16.

Draft frame 10 also has an upstanding bracket structure 56 to which is attached by a pin 58, above-mentioned upper link 18.

Draft frame 10 may therefore be propelled or pulled by means of tractor 12 and also lifted and carried on the tractor in the manner well known in connection with the usual three-point hitch. It is to be noted that links 40 and 42 allow the plow as a whole to swing from side to side about a virtual hitch point 59 in case arms 14 and 16 are prevented from swinging from side to side as in certain tractors, and which transmits any side thrust of the plow to the tractor at a favorable point as explained in the patent to Campbell No. 2,949,161 and assigned to applicant's assignee.

Beam frame or carrier 20 comprises essentially a transverse tubular member 60 to which above-mentioned plows 22 and 24 are rigidly and ruggedly attached by beams 62 and appropriate braces, not necessary to describe in detail. Member 60 is rigidly fixed, for example, by a reenforcement 64, in relation to a shank element 66 journaled in above-mentioned bearing 32 so that carrier 20, as a whole, may be turned over along with shank 66 while supported in bearing 32.

Figure 3:
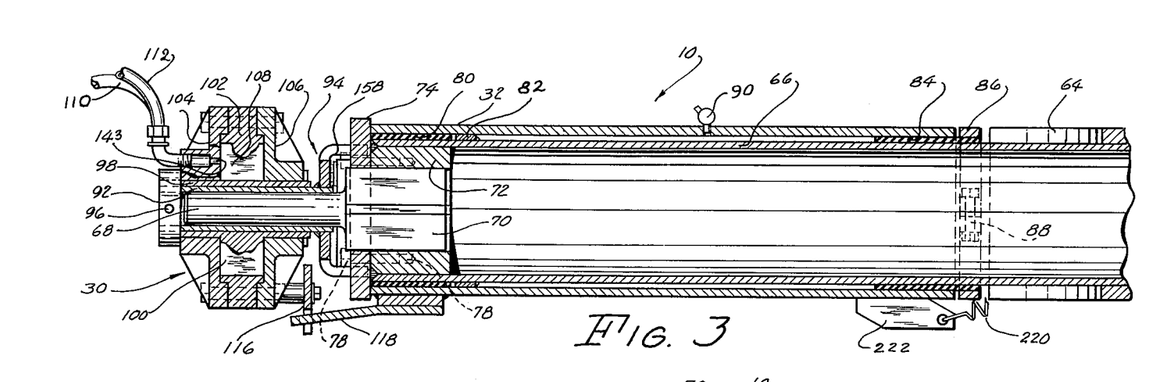
FIG. 3 is an enlarged vertical sectional view on the line 3—3 of FIG. 1.

Shank 66 has a reduced portion or stem 68, FIG. 3, rigidly fixed therewith and constituting a continuation of shank 66. Stem 68 has a substantially enlarged portion 70, in the present instance square in the cross section and fitted within a bushing 72 ruggedly fixed as by welding within shank 66, bushing 72 having a complementary opening for receiving enlargement 70 in a non-rotatable manner. Enlargement 70 also has fitted thereon, the plate or hub portion 74 of a rotating or indexing finger or arm 76, see also FIG. 4, hub 74 being strongly secured to bushing 72 by screws, bolts, or the like 78.

It will now be apparent that index arm 76 and hub 74 can transmit extremely heavy torque to shank 66 without danger of failure or damage to these rugged parts.

Hub 74 contacts the forward edge of sleeve bearing 32 so that draft force in the latter is transmitted thru hub 74, bolts 78 and bushing 72 to shank 66, thereby propelling the beam frame.

Interposed between shank 66 and sleeve bearing 32 is a front bushing 80 which in the preferred embodiment is made of a plastic material having suitable bearing properties, several of which are well known, one of the commonly used varieties being known as "nylon." Bushing 80 fills the space between shank 66 and bearing 32, and is maintained in place by an abutment 82 welded or otherwise fixed on shank 66.

A bushing 84 of similar material is interposed between sleeve 32 and shank 66 at the opposite end of the sleeve from bushing 80 and projects, in the present instance rearwardly, from sleeve 32 into the space within a compression collar or ring 86. Ring 86 may be compressed about bushing 84 by means of a bolt 88, and serves to clamp bushing 84 immovably on shank 66 and also to prevent forward displacement of shank 66 by engagement with the rear end of sleeve 32. In this way, a relatively low-friction bearing is provided for shank 66 for turning of carrier 20, and the space between bushings 80 and 84 provides a reservoir for grease or other lubricant introduced thru a grease fitting 90.

Shank 66 is rotated when desired by above-mentioned motor 30 which is carried on shank extension or stem 68. A sleeve 92 journaled on stem 68 constitutes part of an index actuator 94 and, upon rocking, drives index arm 76 as will appear. Carried on sleeve 92 and fixed thereto by means of a pin 96 is a sleeve 98 constituting the rotor part of above-mentioned motor 30. Rotor part 98 has a vane 100 which has a sliding fluid-tight fit within a ring 102 and between heads or housing plates 104 and 106. A stationary abutment 108 is fixed between the heads 104 and 106 and has a sliding fluid-tight fit against sleeve 98. Introduction of pressure fluid between abutment 108 and vane 100 will cause movement of vane 100, and rotation of sleeve 98 in a manner well known. Fluid may be introduced and withdrawn from the two sides of abutment 108 thru conduits 110 and 112 under control of a valve 114 on the tractor, the fluid coming from a source on the tractor of commonly used type, not necessary to show and describe.

Figure 2:
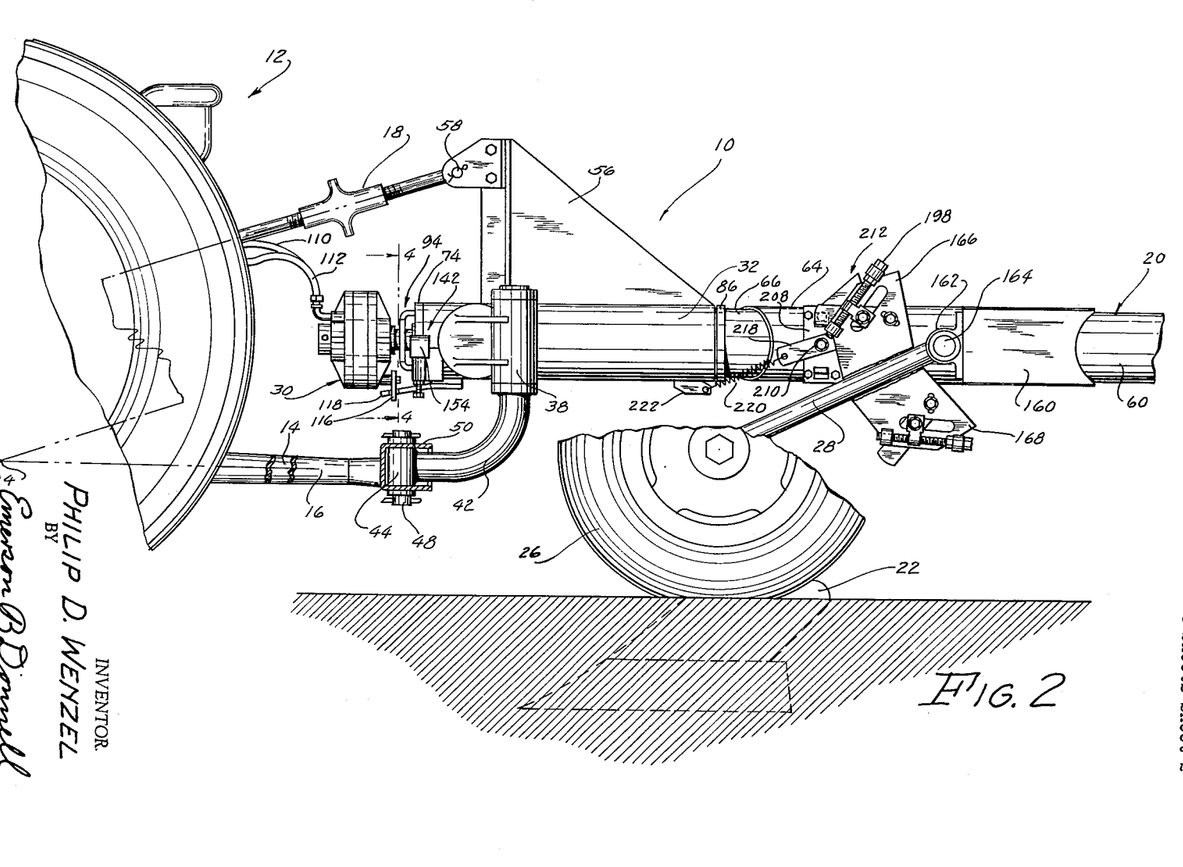
FIG. 2 is a left side elevation of the same with parts broken away and others removed.

The force of the pressure fluid will tend to move abutment 108 and cause undesired rotation of the outer parts or stator of motor 30, being ring 102 and heads 104 and 106, and this is prevented by a lug 116 which is interlocked with a bracket 118 ruggedly fixed to sleeve 32. The interlocking is preferably with slight clearance or lost motion so that the stator parts or stator of motor 30 is free to find its own position on rotor 98 and there is no tendency toward strain or damage to the finely fitted parts. The interlocking however prevents undesired axial movement of motor 30 on stem 68 as indicated in FIGS. 2 and 3.

It will be noted that the working parts so far described are entirely enclosed and protected from the dirt usually encountered in the plowing operation, and no finely finished part is exposed; as for example, the polished piston rod in the usual cylinder type hydraulic motor.

Figure 4:
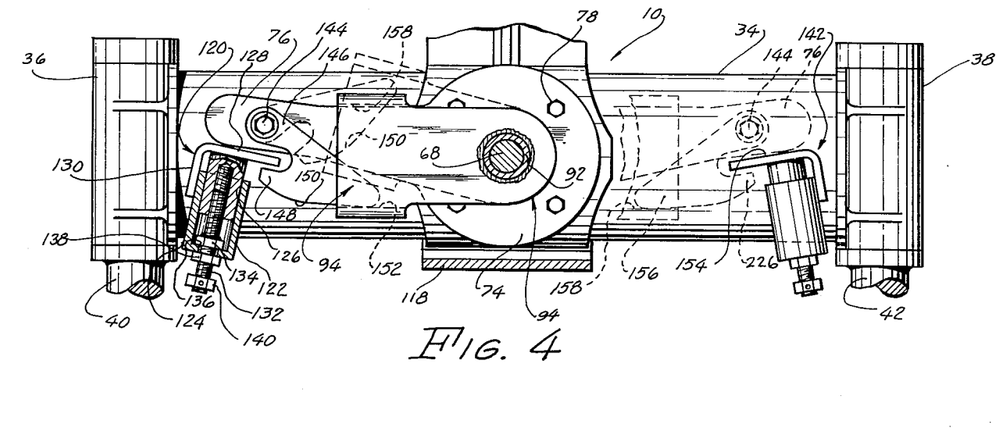
FIG. 4 is an enlarged vertical sectional view on the line 4—4 of FIG. 2.

As stated, rotation of rotor sleeve 98 causes rotation of sleeve 92 and thereby causes rotation of index arm 76. As is known, the usual practice is to run the tractor with one wheel in the furrow so that the tractor runs in a tilted position or attitude. The deeper the furrow, the more the tilt, and since the plow should run level, the relation between the tractor and plow must be adjustable. As best seen in FIG. 4, index arm 76, when rotated counterclockwise, contacts a stop 120 which will arrest the rotation and determine the relative attitude of the plow. A shell 122 is fixed on draft frame 10 and has a flat side 124. A stem 126 is slidable within shell 122 and has a cap or pad 128 for contact of arm 76 at the end of the counterclockwise movement. Stem 126 is fixed to pad 128 which has an apron portion 130 slidable along flat side 124 to prevent rotation of pad 128 and stem 126. A special bolt 132 is threaded into stem 126 and has a collar 134 permanently fixed thereto and engaging a shoulder 136 within shell 122. Bolt 132 is journaled in shoulder 136 and has a lock-nut 138 and a nut or head portion 140 by means of which portion 132 may be rotated to adjust the position of pad 128. As will be apparent, adjustment of bolt 132 will determine the position of the carrier or beam frame 20 in relation to the draft frame 10.

A duplicate 142 of stop 120 is provided in position to arrest arm 76 upon reaching the extent of its rotation in a clockwise direction.

It is to be noted that the displacement of fluid caused by movement of vane 100 is the same for each degree of rotation, and it follows that the movement of vane 100 will be uniform in response to a steady flow of fluid into the space between the vane and abutment 108. Unlike any kind of cylinder and piston type of motor, no motion transmitting mechanism is necessary between motor 30 and carrier 20, except a direct mechanical connection. In the past, mechanism has been used with cylinder type motors which tended to multiply the motion of the carrier toward the ends of the ram stroke, with the result that it was difficult to control the turning of the carrier which tended to speed up as it approached the stops at the ends of the turning movement. It would then encounter the stops at this increased velocity and impart a severe shock to the entire mechanism. In the disclosed device, after the initial acceleration, the motion is steady, and may be controlled by regulating the rate of fluid flow. In the present instance the flow of fluid into motor 30 is through an orifice 143 which is limited in cross section to pass fluid at a rate which will give the desired rate of travel and avoid the shock loads referred to. While it would be desirable to provide a restriction in both conduits 110 and 112, it is to be noted that a single restriction will be effective since, at times when fluid is coming in thru an unrestricted opening, a corresponding volume must go out thru the restricted orifice 143, which will effectively limit the rate of movement as before.

Restriction in other parts of the hydraulic system would also be effective in limiting the rate of turning, and any such arrangement for eliminating excessive speed and shock loading is considered part of the invention.

While the plows are in operation they are locked in position and released as necessary by mechanism which will now be described.

Index arm 76 has pivoted thereon by a bolt 144 a latch 146 having a lip 148 and a cam surface 150, and in the position of the parts shown, lip 148 is engaged beneath pad 128, effectively preventing any swinging of arm 76, and locking the plow carrier in position for plowing. When it is desired to reverse the carrier, activation of motor 30 will first cause limited rotation of sleeve 92 in a clockwise direction, as seen in FIG. 4. This initial movement will swing index actuator 94 and bring a pad 152 into contact with cam surface 150. Slightly more movement will raise cam surface 150 rotating latch 146 and withdrawing lip 148 from beneath cap 128. At this point, pad 152 will have moved far enough to encounter the edge of arm 76, whereupon sufficient force (both hydraulic and mechanical) will be built up substantially instantaneously to move arm 76 and with it shank 66 and carrier 20.

When the carrier has swung far enough so that the opposite plows are in proper position, arm 76 will hit a cap 154 on stop 142, as seen in dotted lines in FIG. 4, to arrest the motion, and a latch 156, in the present instance also on bolt 144, will engage cap 154 to lock the parts in the new position. A pad 158 on actuator 94 now lies beneath arm 76 in position to release latch 156 upon initial movement of actuator 94 in the other direction, while pad 152 rests on arm 76 and supports actuator 94. As will be apparent, counterclockwise movement of actuator 94 will cause pad 158 to release latch 156 and free arm 76 for return movement. Thus, carrier 20 may be turned over at any time when the plows are raised, while it remains securely locked in position at all times when motor 30 is inactivated.

Figures 5, 6:
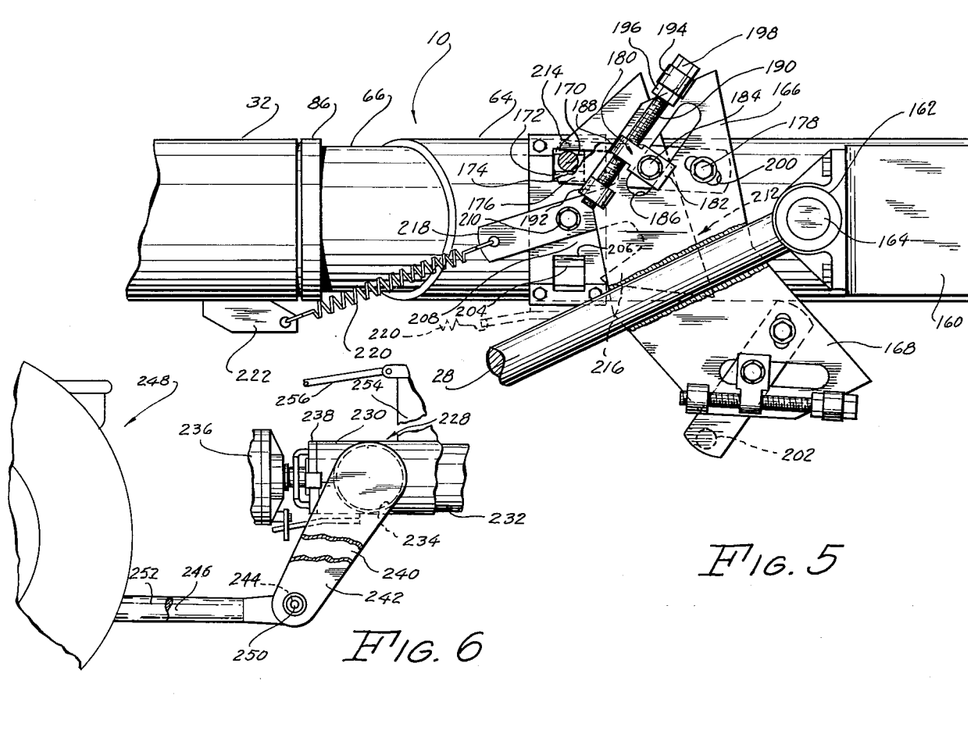
FIG. 5 is an enlarged side elevation of a portion of the mechanism shown in FIG. 2.
FIG. 6 is a fragmentary side elevation of a modification.

Turning now to the gauge wheel, FIGS. 1, 2 and 5, it is pointed out that pipe 60 has a bracket 160 fixed thereto, spaced from shank 66, to which is secured a bearing 162. Journaled in bearing 162 is an end portion 164 of above-mentioned axle 28.

It is to be noted that the direction of turning of carrier 20 is such that, assuming the plow in raised position, gauge wheel 26 would move away from the observer in FIG. 2, when the plow is being turned or reversed. It will also be appreciated that upon completion of one-half of the turn-over movement, axle portion 164 will have reached a mid-position and will become substantially vertical, while the main portion of axle 28 will be swingable in a horizontal plane as determined by portion 164 journaled in bearing 162. As slightly more movement is achieved, the plane in which axle 28 may swing will become inclined downwardly and toward the observer, and wheel 26 will swing toward the observer and ultimately take a position corresponding to that in FIG. 2, but on the far side of shank 66. It then is in position to serve the left-hand plow bottoms in the same manner that it has just been serving the righthand plow bottoms. The wheel, thru suitable mechanism on axle 28 is locked in one or the other of these two positions during operation but is free to swing in the region of said mid-position. It is to be noted that the swinging of axle 28 starts well in advance of the completion of the turn-over movement, in view of the relatively low frictional resistance of bearing 162 to journal portion 164, and may be completed even before the end of the turn-over movement. The wheel therefore does not drop from one position to the other, but starts to move gradually and does not acquire substantial or excessive momentum before being stopped in its new position. There is thus no serious shock load imposed on the structure by the shifting of the wheel.

Axle 28 has fixed therewith, adjacent portion 164 a wing plate 166, as best seen in FIG. 5, located on what might be termed the upper side of axle 28, in the position shown in FIG. 2. A similar or identical wing plate 168 is fixed to the lower side of axle 28, both plates being ruggedly attached as by welding. Wing plate 166 carries a stop means or pin 170 which it supports in fixed relation to axle 28, and which, at the extremity of movement of the latter encounters a pad 172 carried on a bracket 174, rigidly fixed as by welding, to shank 66. In this manner axle 28 is arrested and its position is determined in relation to shank 66 and the carrier. As heretofore explained, the position of wheel 26 determines the depth at which the plow bottoms will operate.

Pad 172 is preferably made of a highly durable type of rubber or rubber-like material of which a number of examples are well known. Thus, when pin 170 encounters pad 172, any detrimental shock effect is effectively dissipated.

Pin 170 is adjustable in relation to axle 28. For this purpose, it is permanently and ruggedly united with a lever arm 176 pivoted on a fulcrum bolt 178 carried in plate 166 adjacent axle 28 so as to place arm 176 in its mid position approximately at right angles to axle 28. A fitting 180 has a hub portion 182 carrying a bolt 184, the whole extending thru a slot 186 in plate 166 and engaged with arm 176. The remainder of fitting 180 comprises a nut-like portion 188 engaged with a screw 190 journaled in spaced bearings 192 and 194 carried on plate 166 in position to place screw 190 sharply transverse to arm 176. A lock-nut 196 is threaded on screw 190, and screw 190 has a head 198 by which it may be turned. With bolts 178 and 184 loosened and lock-nut 196 spaced from bearing 194, turning of head 198 will shift fitting 180 along the length of screw 190 thereby changing the position of stop pin 170 in relation to axle 28 and portion 164. When the adjustment is accomplished, nut 196 and bolts 178 and 184 may be tightened to maintain the adjustment, the clamping action being sufficiently effective that pin 170 will not be displaced by the repeated impacts with pad 172.

Bolt 178 passes thru a slotted hole 200 in plate 166 to permit the straight line movement of bolt 184 as fitting 188 travels along the length of screw 190.

A stop means or pin 202, preferably identical to pin 170, is supported and adjusted in a similar manner from plate 168, and encounters a pad 204 on a bracket 206, also fixed on shank 66, when the carrier is turned over and axle 28 is in its opposite position.

Brackets 174 and 206 are enclosed in a housing portion 208 which also carries a fulcrum member 210 for a locking means or keeper generally designated as 212, having hook portions 214 and 216 and a stem 218. Stem 218 is connected by a spring 220 with a lug 222 fixed on the underside of draft frame 10 centrally therewith. Since housing 208 and keeper 212 are in a sense on one side of shank 66, spring 220 will be stretched downwardly between stem 218 and lug 222, the specified relation of the parts urging hook portion 214 into a position engaging above-mentioned pin 170. As pin 170 approaches the position shown in FIG. 5, it encounters hook portion 214, tilting keeper 212 in a clockwise direction and stretching spring 220. As soon as pin 170 clears hook 214 and is stopped by pad 172, hook 214 will be shifted by spring 220 into retaining engagement with pin 170, the pin being maintained in this position by hook 214 until such time as the carrier is again reversed.

It will be noted that, in the position of the parts shown in FIG. 2, keeper 212 is disposed in a position upwardly displaced from lug 222 and on one side of shank 66. As the plow turns over, keeper 212 will be carried to the aforesaid mid-position in which it is beneath shank 66, as seen in dotted lines in FIG. 5, and wherein stem 218 is in substantially horizontal alignment with lug 222. In this position, stem 218 by reason of the pull of spring 220 will take a position substantially in alignment with lug 222 and parallel to the axis of shank 66 in which position hook 214 will have moved away from pin 170 leaving the latter free to move away from pad 172, which it will do in accordance with the action just described. A little later, during the turn-over movement, pin 202 will be approaching pad 204, but by this time, stem 218 will have started to travel up the far side of shank 66, in a sense wrapping spring 220 about the shank on the opposite side. This will rock stem 218 in the opposite direction (in relation to shank 66) and bring hook 216 into the vicinity of pad 204, to engage pin 202 when the latter shall have moved far enough to encounter pad 204. In this way, gauge wheel 26 is automatically latched in its correct position to control either the right- or left-hand plows, as required, and the exact position of the gauge wheel can be accurately controlled by precise adjustment of pins 170 and 202.

In operation, the plow is hitched to a tractor by means of pintles 52 and 54, and upper link 18, and may swing up and down in a manner such that the plow can "float" or swing up and down about a virtual hitch point 224. Links 14 and 16 are rigid side to side in the type of tractor represented at 12, and draft frame 10 may swing side to side by reason of the presence of links 40 and 42, the plow finding its own position by swinging substantially about hereinbefore mentioned virtual hitch point 59, and when lifted or lowered by the tractor mechanism, it also swings about hitch point 224.

When it is desired to turn the plow, for example at the end of the field, the plow is first lifted by raising links 14 and 16 in the usual manner, and when the plow is clear of the ground, pressure fluid is introduced into motor 30, through conduit 112, and orifice 143, causing vane 100 to start to move away from the observer in FIG. 3, rotating sleeve 98. Thru pin 96, this movement rotates sleeve 92 and starts clockwise or upward swinging of index actuator 94. The first part of this movement contacts pad 152 with cam surface 150 of latch 146 and shifts it upwardly to remove lip 148 from beneath cap 128. Pad 152 then contacts index arm 76 and rotates it in a clockwise direction carrying with it shank 66 and carrier or beam frame 20.

The movement will be controlled by the rate at which fluid can pass thru orifice 143, and when the end of the movement is reached, arm 76 will contact cap 154, thus setting the plows in position for the return trip, while throwing the soil in the same direction as before, as related to the field. In this position, latch 156 will have engaged by means of a lip 226, above-mentioned cap 154 in a manner similar to the previous engagement of latch 146 with cap 128. The plows in this manner are locked in the new working position.

It will be observed that latches 146 and 156 are heavy rugged elements, pivoted on strong bolts, the whole being of such proportions as to operate by gravity without lubrication, and of such a nature, as not to be encumbered by the rather substantial amount of dirt encountered in this kind of service.

As the turning movement of carrier 20 is initiated, the direction is such that gauge wheel 26 passes down, across underneath the carrier, and up on the other side. Axle 28 will not swing or change its relation to the carrier until after portion 164 becomes substantially vertical. At this point, in view of the position of lug 222, keeper 212 will have been shifted so that stem 218 is disposed parallel to shank 66, and pin 170 will be released. A small amount of additional movement will start axle 28 swinging across beneath shank 66 so that pin 202 will approach pad 204. In view of the relatively low frictional resistance of portion 164, axle 28 will swing easily and pin 202 will ordinarily reach pad 204 before any large momentum is built up in the axle and wheel. The rotating of the carrier will have placed stem 218 by this time, at least to some extent, on the other side of shank 66 from that shown in FIG. 2. Stem 218 will therefore be inclined in the other direction and hook portion 216 will be in the path of pin 202. It will be pushed aside by the movement of the pin and impelled by spring 220 acting on stem 218 to a position above pin 220, thus locking the latter in position against pad 204. The turn-over movement is then complete and gauge wheel 26 is in condition to support the plows of the opposite hand. Again the exposed mechanism is rugged and not such as would be affected by the presence of dirt.

As heretofore noted, the precision and highly finished parts of the machine are entirely enclosed and protected from such material. Also, it is to be observed that there are no parts sliding in guides which might be prevented from working by the presence of mud, stones, and the like.

It is to be noted that variations in the details of the arrangement are contemplated, for example in the use of such a plow with other types of tractor, certain changes are necessary. Thus, in some tractors the links corresponding to above described links 14 and 16 are movable side to side, as well as up and down. Also, the links commonly converge in a forward direction so that any implement connected to the links may swing side to side about a virtual hitch point defined by the point of intersection of the links as extended. For this type of tractor, a draft frame 228, FIG. 6, would be provided having a sleeve bearing 230 for carrying a shank 232 of the carrier preferably identical with that heretofore described.

Sleeve bearing 230 is rigidly connected with a transverse tubular frame member 234, and shank 232 carries a motor 236 in a manner similar or identical to that in which above-mentioned shank 66 carries motor 30. An index arm 238 is similar to and operates in the same manner as index arm 76. Tubular member 234 has downwardly extending side plates 240 and 242 ruggedly fixed thereto as by welding. Plate 240 carries a pintle 244 which connects, thru a link 246 extending forwardly, to a tractor 248. In similar manner, plate 242 has a pintle 250 which connects to a link 252 also extending forwardly to tractor 248. Frame 228 has an upwardly extending mast structure 254 which connects thru an upper link 256 with a point on tractor 248 so that frame 228 is carried on the tractor in a stable manner and may be lifted and lowered in a manner similar to that hereinbefore described. However, since links 246 and 252 are arranged for side-to-side swinging (as well as link 256), the modified plow may swing about the virtual hitch point defined by links 246 and 252, rather than about one of its own, as in the case of the first described embodiment. Otherwise, the operation of the modification of FIG. 6 may be identical with that of the other figures.

Other modifications may well occur to those skilled in the art, and it is to be understood that the invention is not limited to the details disclosed, or in fact in any manner beyond that defined in the claims.

What is claimed as new and desired to be secured by Letters Patent of the United States is:

1. In a two-way plow the combination of a draft frame, a beam frame having a
    shank
    journaled in said draft frame, a motor for rotating said beam frame including a
    rotor portion journalled on said shank, a
    stator portion journalled on said rotor portion, rotating means fixed on said shank and engaging with said draft frame and driving means connected to said rotor portion and positioned to engage said rotating means in rotating relation thereto to impart rotation to said shank, and interlocking locating means connected with said stator portion and
        with said draft frame and adapted to prevent any material undesired rotation or axial shifting of said stator portion.

2. A two-way plow including a draft frame and a beam frame, said draft frame comprising a
    sleeve bearing extending substantially in the direction of travel of the plow,
    means for applying draft to said sleeve bearing, said beam frame comprising a
    shank portion journaled in said sleeve bearing, and indexing arm means on said shank portion adapted for rotating said shank portion in said sleeve bearing, means connected with said indexing arm means for rotating said indexing arm means, latch means engaged with said indexing arm means and with said draft frame for locking said indexing arm means, and accordingly said beam frame in a predetermined position, and said indexing means being positioned to engage an end of said sleeve to transmit draft from said draft frame to said shank, and so to said beam frame.

3. In a reversible plow of the type having a draft frame and a beam frame journaled therein, a draft frame comprising a sleeve bearing, said beam frame having a shank journaled in said sleeve bearing, an index arm on said shank in engagement with said sleeve bearing to transmit draft from said draft frame to said beam frame, means connecting said index arm in rotating relation to said shank, a stub shaft extending beyond said shank in the same general direction as said shank, a stop on said draft frame in position to limit swinging of said index arm in one direction, a second stop on said draft frame in position to limit swinging of said index arm in the other direction, a latch member on said index arm engaged with one of said stops, means rockable about said stub shaft engageable, upon rocking movement, with said latch member to disengage said latch member from said stop, said rockable means being engaged with said index arm to swing said index arm toward said second stop, and means on said stub shaft for rocking said rockable means.

4. In a reversible plow a draft frame, a carrier having a shank portion journaled in the frame, extending in a fore-and-aft direction and having a portion extending beyond said frame, a motor having a rotatable part journaled on said extending portion, and a relatively stationary part journaled on said rotatable part, rotating means fixed on said shank portion and engaging with said draft frame for propelling said carrier from motion of said draft frame, and driving means connected to said rotatable part and positioned to engage said rotating means in rotating relation thereto to impart rotation to said shank, and interlocking means connected with said stationary part and with said frame and operative to prevent material rotation of said stationary part about said rotatable part whereby actuation of said motor will cause rotation of said shank portion and reversal of the plow.

5. In a two-way plow of the type having a draft frame and a beam frame journaled therein having right and left-hand plow bottoms thereon and means for rotating said beam frame for reversing the plow, a gauge-wheel axle journaled on said beam frame for swinging movement from a position suitable to control said right-hand plow bottom to a position suitable to control said left-hand plow bottom, a gauge wheel on said gauge-wheel axle, means on said beam frame including a first stop means and a second stop means below said first stop means in one position of the parts, a support including a third stop means on said gauge-wheel axle, said first and third stop means being positioned in contact with each other and determining a working position for said right-hand plow bottom, a fourth stop means on said gauge wheel axle and positioned to contact said second stop means in another position to determine a working position for said left-hand plow bottom, locking means pivoted on said beam frame between said first and said second stop means, engaged with said third stop means and maintaining it in the first-mentioned working position, and means engaged with said draft frame and with said locking means operable by rotating of said beam frame to rock said locking means about its pivotal connection into engagement with said fourth stop means, whereby to maintain said gauge wheel axle in the second-mentioned working position.

6. A two-way plow comprising a draft frame, said draft frame having a sleeve bearing extending substantially in the direction of travel of the plow, a generally T shaped beam frame having a shank portion journaled in said sleeve bearing, a right-hand plow bottom carried by said T shaped beam frame, a left-hand plow bottom carried by said T shaped beam frame, circumferentially opposite said right-hand plow bottom, index arm means on said shank for rotating said shank to bring said right and said left-hand plow bottoms selectively into operative position, latch means engaged with said index arm means and with said draft frame for locking said index arm means, and accordingly said beam frame in a predetermined position, and said index arm means being positioned to engage said sleeve bearing to receive the draft from said draft frame and transmit it to said shank.

7. A two-way plow comprising a draft frame and a beam frame, said beam frame having a shank portion disposed substantially horizontally and journaled in said draft frame generally in the direction of progress of the plow, a right-hand plow bottom on said beam frame, a left-hand plow bottom on said beam frame circumferentially spaced from said right-hand plow bottom, a motor including a rotor portion journaled on said shank portion, and index arm fixed on said shank portion, driving means journaled on said shank portion in driven relation with said rotor and also positioned in driving relation with said index arm, and a stator portion journaled on said rotor portion, means connected with said stator portion and with said draft frame, operative to prevent rotation of said stator portion relative to said draft frame, and means to cause rotation of said rotor portion.

8. A two-way plow comprising a draft frame and a beam frame, said beam frame having a shank portion disposed substantially in the direction of progress of the plow and journaled in said draft frame, a right-hand and a left-hand plow bottom, said plow bottoms being circumferentially spaced on said beam frame, means for rotating said shank for bringing said plow bottoms selectively into contact with the ground, a gauge wheel axle journaled on said beam frame for swinging movement from a position suitable to control said right-hand plow bottom to a position suitable to control said left-hand plow bottom, a gauge wheel on said gauge wheel axle, means on said beam frame including a first stop means and a second stop means below said first stop means in one position of the parts, a support including a third stop means on said gauge wheel axle, said first and third stop means being positioned in contact with each other and determining a working position for said right-hand plow bottom, a fourth stop means on said gauge wheel axle and positioned to contact said second stop means in another position to determine a working position for said left-hand plow bottom, locking means pivoted on said beam frame between said first and said second stop means, engaged with said third stop means and maintaining it in the first-mentioned working position, and means engaged with said draft frame and with said locking means operable by rotating of said beam frame to rock said locking means about its pivotal connection into engagement with said fourth stop means, whereby to maintain said gauge wheel axle in the second-mentioned working position.

9. In a turn-over plow of the type having a draft frame and a beam frame, said beam frame having a shank disposed substantially in the direction of progress of the plow and rotatable in said draft frame, means connected with the draft frame and with the beam frame so that said beam frame is propelled by movement of said draft frame and is rotatable about an axis extending in the direction of travel of the plow, a right-hand plow on said beam frame, a left-hand plow on said beam frame circumferentially spaced from said right-hand plow, and means connected with said draft frame and with said beam frame for rotating said beam frame about said axis from a position for right-hand plowing, 180° through a mid-position to a position for left-hand plowing, the combination of a gauge wheel axle on said beam frame, swingable about an axis transverse to said direction of travel, stop means on the axle spaced therefrom in a plane of rotation thereof, a fulcrum on said rotatable shank, a keeper pivoted on said fulcrum and swingable in a plane including the path of swinging movement of said stop means, in one position engaged with said stop means, a stem on said keeper, extending lengthwise of said shank, means providing an anchorage on said draft frame spaced forwardly of said stem and in the plane common to said shank and said stem, in said mid-position of said beam frame, and a spring connected to said anchorage and to said stem to urge said stem to swing in the direction of said anchorage.

10. In a turn-over plow of the type having a draft frame and a beam frame, said beam frame having a shank disposed substantially in the direction of progress of the plow and rotatable in said draft frame, means connected with the draft frame and with the beam frame so that said beam frame is propelled by movement of said draft frame and is rotatable about an axis extending in the direction of travel of the plow, a right-hand plow on said beam frame, a left-hand plow on said beam frame circumferentially spaced from said right-hand plow, and means connected with said draft frame and with said beam frame for rotating said beam frame about said axis from a position for right-hand plowing, 180° through a mid-position to a position for left-hand plowing, the combination of a gauge wheel axle on said beam frame, swingable about an axis transverse to said direction of travel, stop means on the axle spaced therefrom in a plane of rotation thereof, a fulcrum on said rotatable shank, a keeper pivoted on said fulcrum and swingable in a plane including the path of swinging movement of said stop means, in one position engaged with said stop means, a stem on said keeper, extending lengthwise of said shank, means providing an anchorage on said draft frame spaced forwardly of said stem and in the plane common to said shank and said stem, in said mid-position of said beam frame, and means connected to said anchorage and to said stem to urge said stem to swing in the direction of said anchorage.

11. In a turn-over plow of the type having a draft frame and a beam frame, said beam frame having a shank disposed substantially in the direction of progress of the plow and rotatable in said draft frame, means connected with the draft frame and with the beam frame so that said beam frame is propelled by movement of said draft frame and is rotatable about an axis extending in the direction of travel of the plow, a right-hand plow on said beam frame, a left-hand plow on said beam frame circumferentially spaced from said right-hand plow, and means connected with said draft frame and with said beam frame for rotating said beam frame about said axis from a position for right-hand plowing, 180° through a mid-position to a position for left-hand plowing, the combination of a gauge wheel axle on said beam frame, swingable about an axis transverse to said direction of travel, stop means on the axle spaced therefrom in a plane of rotation thereof, a fulcrum on said rotatable shank, a keeper pivoted on said fulcrum and swingable in a plane including the path of swinging movement of said stop means, in one position engaged with said stop means, a stem on said keeper, extending lengthwise of said shank, means providing an anchorage on said draft frame spaced forwardly of said stem and in the plane common to said shank and said stem, in said mid-position of said beam frame, a spring connected to said anchorage and to said stem to urge said stem to swing in the direction of said anchorage, and said keeper having a hook portion in the path of said stop means, positioned to tilt said keeper about said fulcrum by reason of contact of said stop means with said hook, said spring being adapted to yield to provide for such tilting, and to return said keeper to the position which it occupied before said tilting, when said stop means has passed.

12. In a two-way plow of the type having a beam frame rotatable about an axis extending in the direction of travel for changing from right to left-hand plowing, having right-hand and left-hand plow bottoms on said beam frame and means for rotating said beam frame, a gauge wheel axle pivoted on said beam frame swingable in a plane generally parallel to the direction of travel from a position determining the depth of right-hand plowing to a position determining the depth of left-hand plowing, means for securing said axle in one of said positions including a wing plate fixed on said axle in a plane generally parallel to the path of swinging of said axle, a fulcrum on said wing plate, a lever arm pivoted on the fulcrum and extending generally in the direction of said axle, stop means on the lever arm spaced from the fulcrum, a fitting secured to the lever arm spaced from the fulcrum, bearing means on said wing plate spaced from said fitting, a screw journaled in said bearing means and threadedly engaged with said fitting, means operable to prevent axial movement of said screw in said bearing means, and means on said beam frame engaged with said stop means so located as to secure said stop means and said axle in position to determine a desired plowing depth, whereby adjustment of said screw will change the plowing depth determined by engagement of said means on said beam frame, with said stop means.

13. In a two-way plow of the type having a beam frame rotatable about an axis extending in the direction of travel for changing from right to left-hand plowing having right-hand and left-hand plow bottoms on said beam frame and means for rotating said beam frame, a gauge wheel axle pivotally mounted on said beam frame swingable in a plane generally parallel to the direction of travel from a position determining the depth of right-hand plowing to a position determining the depth of left-hand plowing, means for securing said axle in one of said positions including a wing plate fixed on said axle in a plane generally parallel to the path of swinging of said axle, a fulcrum on said wing plate, a lever arm pivoted on the fulcrum and extending generally in the direction of said axle, stop means on the lever arm spaced from the fulcrum, a fitting secured to the lever arm, between said fulcrum and said stop means, bearing means on said wing plate spaced from said fitting, a screw journaled in said bearing means, and threadedly engaged with said fitting, means operable to prevent axial movement of said screw in said bearing means, and means on said beam frame engaged with said stop means so located as to secure said stop means and said axle in position to determine a desired plowing depth, whereby adjustment of said screw will change the plowing depth determined by engagement of said means on said beam frame, with said stop means.

References Cited by the Examiner

UNITED STATES PATENTS

| 2,625,090 | 1/1953 | Pursche | 172—206 |
| 2,666,376 | 1/1954 | Pursche | 172—227 |
| 2,676,524 | 4/1954 | Bashor | 172—161 X |
| 2,777,373 | 1/1957 | Pursche | 172—212 |
| 2,845,014 | 7/1958 | Pursche | 172—212 X |
| 2,891,459 | 6/1959 | Tominac | 172—162 X |
| 2,927,651 | 3/1960 | Murray | 172—212 |
| 2,959,232 | 11/1960 | Gordon | 172—227 X |
| 2,969,843 | 1/1961 | Pursche. | |
| 3,007,531 | 11/1961 | Silver | 172—225 |
| 3,128,832 | 4/1964 | Habare | 172—212 X |

FOREIGN PATENTS

| 171,339 | 5/1952 | Austria. |
| 190,318 | 6/1957 | Austria. |
| 1,130,163 | 9/1956 | France. |
| 549,444 | 10/1956 | Italy. |

ABRAHAM G. STONE, *Primary Examiner.*

T. GRAHAM CRAVER, *Examiner.*